United States Patent
Casarella et al.

(10) Patent No.: US 7,497,205 B2
(45) Date of Patent: Mar. 3, 2009

(54) CONTROLLER AND CONTROL METHOD FOR AN ENGINE CONTROL UNIT

(75) Inventors: Mark Casarella, Ypsilanti, MI (US); Andreas Nilsson, London (GB); David Jonsson, Västra Frölunda (SE); Abdolreza Fallahi, Middx (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/807,728

(22) Filed: May 30, 2007

(65) Prior Publication Data

US 2008/0006245 A1    Jan. 10, 2008

(30) Foreign Application Priority Data

May 30, 2006   (EP)   .................................. 06252794

(51) Int. Cl.
*F02M 51/00*   (2006.01)
*F02M 51/16*   (2006.01)

(52) U.S. Cl. ..................................... 123/479
(58) Field of Classification Search ................. 123/479, 123/480; 73/119 A, 118.1, 117.3, 117.2, 73/117.1, 116; 701/114, 107, 104, 110
See application file for complete search history.

(56) References Cited

U.S. PATENT DOCUMENTS

| | | | | |
|---|---|---|---|---|
| 5,205,152 A | * | 4/1993 | Clarke et al. | 73/9 |
| 6,647,769 B1 | * | 11/2003 | Fujino et al. | 73/119 A |
| 6,964,261 B2 | * | 11/2005 | Warne et al. | 123/436 |
| 2005/0119818 A1 | * | 6/2005 | Jargenstedt | 701/100 |

* cited by examiner

*Primary Examiner*—Mahmoud Gimie
(74) *Attorney, Agent, or Firm*—Thomas N. Twone

(57) ABSTRACT

The invention provides a controller for determining the presence of faults within a fuel injection system of an engine system. The engine system comprises a first injector and at least one further injector, each injector comprising a needle control valve and a pressure control valve. The controller comprises: inputs for receiving data relating to a first engine system parameter; outputs for outputting a control function for controlling the injector valves of each of the injectors, and; a processor for controlling the control function output from the controller. The processor is arranged to output a control function such that the needle control valve of the first injector is kept closed in order to prevent injection from the first injector and to monitor the first engine system parameter as the needle control valve is kept closed, a change in the first engine system parameter indicating that the first injector is operating substantially within normal operating parameters and no or substantially no change in the first engine system parameter indicating that the first injector is faulty.

25 Claims, 8 Drawing Sheets

CONTROLLER AND CONTROL METHOD FOR AN ENGINE CONTROL UNIT

TECHNICAL FIELD

The present invention relates to a controller and control method for an engine control unit. In particular the present invention relates to a controller (and associated method) for determining the presence and location of mechanical faults within the injectors of a fuel-injected engine system. The invention additionally relates to a carrier medium carrying computer readable code for controlling a processor or computer to carry out said control method.

BACKGROUND TO THE INVENTION

Many engine systems use high pressure unit injectors having two valves per injector (cylinder). The first valve is located in the pumping part of the injector and cooperates with the cam shaft and a pumping plunger to create high fuel pressures. This valve is commonly referred to as the pressure control valve. In certain engine systems it is also known as a spill control valve. The second valve controls fuel injection from the injector. This valve is known as the needle or injection control valve.

Depending on the engine configuration, the cam shaft may be mounted to the side of the cylinder block or alternatively it may be mounted above the cylinder block. The first configuration results in an injector where the two valves (pressure control and needle control valves) (and their associated hardware) are separated and located on different parts of the engine. FIGS. 1a, 1b and 2 show the various engine configurations and location of the injector valves.

FIGS. 1a and 1b show a schematic picture of an engine 1 where the cam shaft 2 is mounted to the side of the cylinder block 3. It can be seen that the injector part of the injector 5, which incorporates the needle control valve, is located on top of the cylinder block 3. The injector pump 7, which incorporates the pressure/spill control valve, is located to the side of the cylinder block 3.

The pressure control valve and needle control valve are connected via a high pressure fuel line 9.

An alternative engine arrangement is shown in FIG. 2 which is a sectional view of an injector with an overhead cam arrangement. In this case the cam 11 is mounted directly above the injector 13. As a consequence the pressure control valve 15 and needle control valve 17 are mounted within the same injector structure. In the arrangement of FIG. 2, the pressure control and needle control valves are connected by a supply passage within the body of the injector 13.

In the event of an injector failure within a fuel injected engine system it can be difficult to identify the nature and location of the fault within the engine system. If the injector malfunction is electrical in nature then the fault can generally be identified by the engine management system. However, if the fault is mechanical in nature then the engine management system may not see any difference in its electrical inputs and may therefore be unable to locate or identify a fault.

Failure to identify a fault correctly can lead to wasted time, effort and cost in a service and repair facility because, for example, both pressure control and needle control valves may need to be tested and/or replaced manually before a successful repair can be achieved. It can also be the case that different control valves have different repair procedures and so identifying the location and nature of a fault prior to the commencement of a repair process is highly desirable.

The present invention seeks to overcome or substantially mitigate the above mentioned problems and to provide an apparatus and method for determining the presence of faults within the fuel injection system of an engine.

SUMMARY OF THE INVENTION

Accordingly a first aspect of the present invention provides a controller for determining the presence of faults within a fuel injection system of an engine system. The engine system comprises a first injector and at least one further injector, each injector comprising a needle control valve and a pressure control valve. The controller comprises: inputs for receiving data relating to a first engine system parameter; outputs for outputting a control function for controlling the injector valves of each of the injectors, and; a processor for controlling the control function output from the controller. The processor is arranged to output a control function such that the needle control valve of the first injector is kept closed in order to prevent injection from the first injector and to monitor the first engine system parameter as the needle control valve is kept closed, a change in the first engine system parameter indicating that the first injector is operating substantially within normal operating parameters and no or substantially no change in the first engine system parameter indicating that the first injector is faulty.

In the following description the term injection cycle refers to a cycle of injection events in which all the cylinders of an engine would normally fire. During each injection cycle, the needle control valve of each injector will mostly be closed and will only be opened to allow injection through the injector to take place.

The invention recognises that major faults within an injector of an injection system can be determined by sending a control function to the injector under test (the "first" injector) to keep its needle control valve closed. For an injector that is working correctly keeping the injector control valve closed will mean that no fuel can be delivered from the injector and this will then have the effect that one or more engine system parameters (e.g. engine speed or quantity of fuel injected per injection cycle by the remaining injectors) of the engine system will change. The controller of the present invention therefore acts to keep the needle control valve on a first injector of the engine system closed and to monitor the resultant changes in the measured engine system parameter.

It is noted, however, that if there was a major fault within the first injector such that the injector was already faulty before the needle control valve was instructed to remain closed, then the closure of the valve will have little or no effect on the measured engine system parameter.

The controller therefore determines the presence of faults within the engine system depending on whether the engine system parameter changes or not as a result of the closure of the needle control valve during the whole of the injection cycle.

Therefore, the above described "closed needle" test separates cylinders with completely faulty injectors from cylinders with functioning injectors.

Preferably, the controller is arranged to fix a second engine system parameter of the engine and to monitor changes in the first engine system parameter. For example, the controller may fix the quantity of fuel supplied to the engine system and monitor engine speed changes. Alternatively, engine speed may be fixed during the test and fuel quantities monitored (either the quantity of fuel injected by each, injector not under test per injection cycle could be monitored or alternatively the quantity of fuel injected by all the remaining injectors per injection cycle could be monitored).

Once it has been determined if the first injector has a major fault or not the processor can be arranged to output further control functions to ascertain (i) which control valve is faulty in cases where the first injector has a major fault or (ii) the presence of any minor faults (such as clogged injector nozzles) in cases where the first injector has not been identified as having a major fault.

In the event that the first injector has not been identified as having a major fault the needle control valve can conveniently be slowly re-opened (i.e. the opening period of the needle control valve per injection cycle, can be gradually increased from zero to normal length over the course of a number of cycles) to determine whether the first injector has any of a multitude of more minor injection issues, e.g. partly blocked nozzles. It should be appreciated that the period that the needle control valve is open is determined by the length of a drive pulse that is input to the valve.

The control function output by the controller is derived from a pulse structure. Gradually re-opening the needle control valve in increments, each increment lasting for a number of injection cycles to allow the engine to stabilise, permits the minimum drive pulse structure, i.e. the logic structure that results in injection of fuel into the combustion chamber of the engine from the first injector, to be determined.

In the "closed needle" testing phase the processor sends a control function to keep the needle control valve closed. Once closed the engine can be allowed to stabilise and then the injector valve can be re-opened gradually, by increasing incrementally the opening control function from the controller, so that fuelling is stepwise brought back to the test injector (the first injector). The processor may monitor the first engine system parameter as the length of the "open period" of the injector control valve is increased and, depending on how quickly and how much the parameter varies as fuelling resumes in the first injector, can determine how well injection is working through the first injector.

In a first embodiment, the controller fixes the quantity of fuel delivered to the injectors not under test and monitors changes in the engine speed as the control valves on the first injector are manipulated. If the first injector is operating normally then keeping the needle control valve closed can be expected to result in a drop in engine speed. (It is noted that the fuelling conditions applied to the remaining injectors within the engine are fixed such that the remaining injectors do not try to compensate for any changes to the injector under test (the first injector)).

The processor may then conveniently analyse the engine speed of the engine as the needle control valve of the first injector is gradually re-opened to determine the operational status of the first injector. Alternatively, the processor may monitor the rate of change of engine speed as the valve is opened or analyse the time at which injection recommences.

In the event that the first injector has been identified as having a major fault (i.e. the engine speed did not decrease when the needle control valve of the first injector was closed), then it is highly desirable to determine which of the injector control valves is malfunctioning. This can help reduce unnecessary repair procedures and reduce servicing costs.

The injectors will typically comprise a pumping chamber having a plunger that moves in a reciprocating motion. As the plunger moves down within the pumping chamber within its cycle the fuel within the injector will be pressurised. The needle control valve is actually a switching valve that can alternate between an open position in which a chamber associated with the injector needle is in communication with a low pressure drain and a closed position in which the chamber is in communication with the pumping chamber.

When the needle control valve is in the open position a pressure imbalance will be created between the chamber associated with the injector's needle and thrust surfaces on the needle itself. These pressure differences allow the needle to lift from its seating and for fuel injection to occur.

When the needle control valve is in the closed position however there is no pressure imbalance within the injector and the needle is held against its seating by the action of a spring within the chamber.

The pressure control valve can be opened to allow the pumping chamber to be in fluid communication with a source of fuel or closed in which the fluid communication path is blocked.

It is noted that if the controller outputs a control function to the first injector to create a high pressure without injecting any fuel into the combustion space of the engine (i.e. a control function that closes both the pressure control and needle control valves) then this will put more load on the engine than when the injector is creating a low pressure. This in turn will therefore cause the engine speed of the engine to fall.

However, if either the needle control valve or the pressure valve is malfunctioning in any way then the expected change in engine speed will not be observed by the controller/processor.

The processor may therefore determine the location of a fault within the first injector by closing the pressure control valve of the first injector such that fuel is unable to drain from the injector to the low pressure fuel drain. Depending on whether the needle control valve and pressure control valves are operating correctly different changes in engine speed will be observed by the processor.

Therefore, if the processor outputs a control function to close the pressure control valve and then monitors the engine speed, the presence and location of a fault within the first injector may be determined.

Conveniently if the processor uses the logic described below then the following fault conditions can be identified:
  (i) if the needle control valve is stuck closed and the pressure control valve is operating correctly, then high fuel pressure will be created in a supply passage (or connecting fuel line) between the needle control and pressure control valves. The extra work that this creates for the engine will cause the engine speed to drop and when a significant engine speed drop is detected by the processor the failure can be identified as a needle control valve that is stuck closed. It is noted that this "high pressure" test follows the "closed needle" test described above and is performed only if the "closed needle" test has indicated that there is a major fault (i.e. either the pressure control or needle control valves is faulty) in the injector. If the pressure rises (and therefore engine speed drops) when the pressure control valve is commanded to close then this indicates: (a) that the pressure control valve is working correctly; (b) that by inference it was the needle control valve that caused the "closed needle" test to show a major fault, and; (c) the fact that the pressure increased when the pressure control valve closed indicates that the needle control valve is jammed shut.
  (ii) if the pressure control valve is malfunctioning then the controller will be unable to create a high pressure condition within the injector. In this case, the engine speed will remain unchanged and, after a certain period of time without any significant engine speed change, the processor can determine that the pressure control valve is faulty.

(iii) if the needle control valve is stuck open then any fuel transferred into the first injector will be injected into the combustion space. This will result in an increase in engine speed and so if the processor monitors the engine speed and detects a significant increase in the engine speed then it can determine that the needle control valve is stuck open.

Conveniently, the processor can be arranged to determine the presence and/or location of faults within the first injector by comparing the engine speed data received by the controller's inputs with predetermined engine speed data. Conveniently, the controller may comprise (or may be linked to) a data store for storing predetermined engine speed data.

In a second embodiment, the controller fixes the engine speed of the engine and monitors changes in the quantity of fuel injected by the injectors not under test as the control valves on the first injector are manipulated.

If the engine speed is fixed, then the quantity of fuel injected per injection cycle by the remaining injectors will vary in order to compensate for the first injector when its needle control valve is closed throughout the entire injection cycle. By monitoring the quantity of fuel injected per injection cycle the processor may conveniently determine the operational status of the first injector. If the quantity of fuel injected per injection cycle by the other injectors does not vary (or varies by only a small amount) as the needle control valve is kept closed then this indicates that the first injector has a major fault. If the quantity of fuel injected by the other injectors increases when the needle control valve of the first injector is kept closed then this indicates that the first injector is operating substantially normally.

In the event that the first injector has been identified as having a major fault then the faulty injector valve can once again be identified by outputting a control function from the controller suitable for creating a high internal pressure within the injector, i.e. a control function that closes both the pressure control and needle control valves.

This will put extra load on the engine which should cause the quantity of fuel injected per injection cycle from the other injectors to rise.

If either of the pressure control or needle control valves is malfunctioning however then the expected change in fuel quantities through the other injectors will not be observed.

Conveniently if the processor uses the logic described below then the following fault conditions can be identified:
(i) if the needle control valve is stuck closed and is unable to open when the controller asks it to and the pressure control valve is operating correctly, then high fuel pressure will be created in a supply passage (or connecting fuel line) between the needle control and pressure control valves. The extra work that this creates for the engine will cause the quantity of fuel injected by the other injectors to rise and when a significant fuel quantity rise is detected by the processor the failure can be identified as a needle control valve that is stuck closed.
(ii) if the pressure control valve is malfunctioning then the controller will be unable to create a high pressure condition within the injector. In this case, the quantity of fuel injected by the other injectors will remain unchanged and, after a certain period of time without any significant change, the processor can determine that the pressure control valve is faulty.
(iii) if the needle control valve is stuck open then any fuel transferred into the first injector will be injected into the combustion space. This will result in a decrease in the quantity of fuel injected by the other injectors (to keep the engine speed at its fixed value) and so if the processor monitors the fuel quantity injected by the other injectors and detects a significant decrease in the fuel quantity injected then it can determine that the needle control valve of the first injector is stuck open.

Conveniently, the controller may comprise (or may be linked to) a data store for storing predetermined engine performance data (e.g. expected fuel quantity variations across the injectors as the above test are performed).

Preferably, the controller is arranged to test each injector within the engine in turn.

Preferably, prior to commencing any of the above tests the controller is arranged to stabilise the engine system to a substantially constant engine speed.

Conveniently, the controller may output a notification signal to an output device (such as a computer screen) such that the presence and/or location of faults within the engine can be ascertained by a user.

In the above description it is assumed that the first injector is first tested for major faults and is then subsequently tested for either minor cylinder injection issues or the location of any major faults. Remaining injectors within the engine are then tested once the above tests have been run on the first injector.

However, it is recognised that the controller may first test each cylinder for the presence of major faults and may then re-test those cylinders which it has determined have major faults. The test for the location of major injector faults and the test for the presence of minor cylinder injection issues may therefore be performed independently.

Therefore, according to a second aspect of the invention, there is provided a controller for determining the nature of a fault within an injector of a fuel injection system of an engine system, the injector comprising a needle control valve and a pressure control valve, and the controller comprising inputs for receiving data relating to a first engine system parameter; outputs for outputting a control function for controlling the injector valves of each of the injectors, and; a processor for controlling the control function output from the controller. The processor is arranged to output a control function such that the needle control valve of the injector is kept closed in order to prevent injection from the injector and then to gradually re-open the needle control valve and progressively increase the period that the needle control valve is open, thereby allowing the minimum width of the drive pulse structure that permits injection to take place through the injector to be determined.

Therefore, according to a third aspect of the invention, there is provided a controller for determining the presence of faults within an injector of a fuel injection system of an engine, the injector comprising a needle control valve and a pressure control valve, the pressure control valve being capable of moving between an open position in which the injector is in fluid communication with a source of fuel and a closed position in which the injector is not in fluid communication with the source of fuel, and the controller comprising inputs for receiving data relating to a first engine system parameter; outputs for outputting a control function for controlling the injector valves of the injector, and; a processor for controlling the control function output from the controller. The processor is arranged to output a control function to keep the needle control valve of the injector closed in order to prevent injection from the injector and to output a control function to close the pressure control valve in such a manner that, under normal injector operating conditions pressure within the injector would increase, and to monitor the first engine speed parameter in order to determine the presence of a fault in the valves of the injector.

According to a fourth aspect the present invention provides a method of determining the presence of faults with a fuel injection system of an engine system, the engine system comprising a first injector and at least one further injector, each injector comprising a needle control valve and a pressure control valve, the method comprising: receiving data relating to a first engine system parameter; outputting a control function for controlling the injector valves of each of the injectors; controlling the output function from the controller, wherein the method further comprises outputting a control function such that the needle control valve of the first injector is kept closed in order to prevent injection from the first injector and monitoring the first engine system parameter as the needle valve is kept closed, a change in the first engine system parameter indicating that the first injector is operating substantially within normal operating parameters and no or substantially no change in the first engine system parameter indicating that the first injector is faulty.

According to a fifth aspect the present invention provides a controller for determining the presence of faults within a fuel injection system of an engine system, the engine system comprising a first injector and at least one further injector, each injector comprising a needle control valve and a pressure control valve, and the controller comprising: inputs for receiving data relating to a first engine system parameter; outputs for outputting a control function for controlling the injector valves of each of the injectors, the control function being derived from a control valve drive pulse structure, and; a processor for controlling the control function output from the controller wherein the processor is arranged to output a control function such that the needle control valve of the first injector is kept closed in order to prevent injection from the first injector and to monitor the first engine system parameter as the needle control valve is kept closed, such that: (i) if the processor detects a change in the first engine system parameter then the processor is arranged to gradually re-open the needle control valve and progressively increase the period that the needle control valve is open, thereby allowing the minimum width of the drive pulse structure that permits injection to take place through the injector to be determined, or; (ii) if the processor detects no or substantially no change in the first engine system parameter then the processor is arranged to output a further control function to close the pressure control valve in such a manner that, under normal injector operating conditions pressure within the injector would increase, and to monitor the first engine speed parameter in order to determine the presence of a fault in the valves of the injector.

It will be appreciated that preferred and/or optional features of the first aspect of the invention may be provided in the further aspects of the invention also, alone or in appropriate combinations.

According to a still further aspect of the present invention there is provided a carrier medium for carrying a computer readable code for controlling a processor, computer or other controller to carry out the method of the fourth aspect of the invention.

The invention extends to a vehicle comprising a controller according to the first aspect of the present invention and also to a diagnostic unit for use with a vehicle, the unit comprising a controller according to the first aspect of the present invention.

BRIEF DESCRIPTION OF DRAWINGS

In order that the invention may be more readily understood, reference will now be made, by way of example, to the accompanying drawings in which.

DETAILED DESCRIPTION OF PREFERRED EMBODIMENTS

Injectors used in fuel injection systems are generally controlled electrically by means of a current waveform applied to the valves of the injector, the control function. The control function is derived from a control valve logic structure. In the following description, the term "minimum drive pulse" or "MDP" is used to define the length of a control feature in the logic structure of either the pressure control or needle control valves that results in injection of fuel into the combustion chamber of the engine.

Figure 1A:
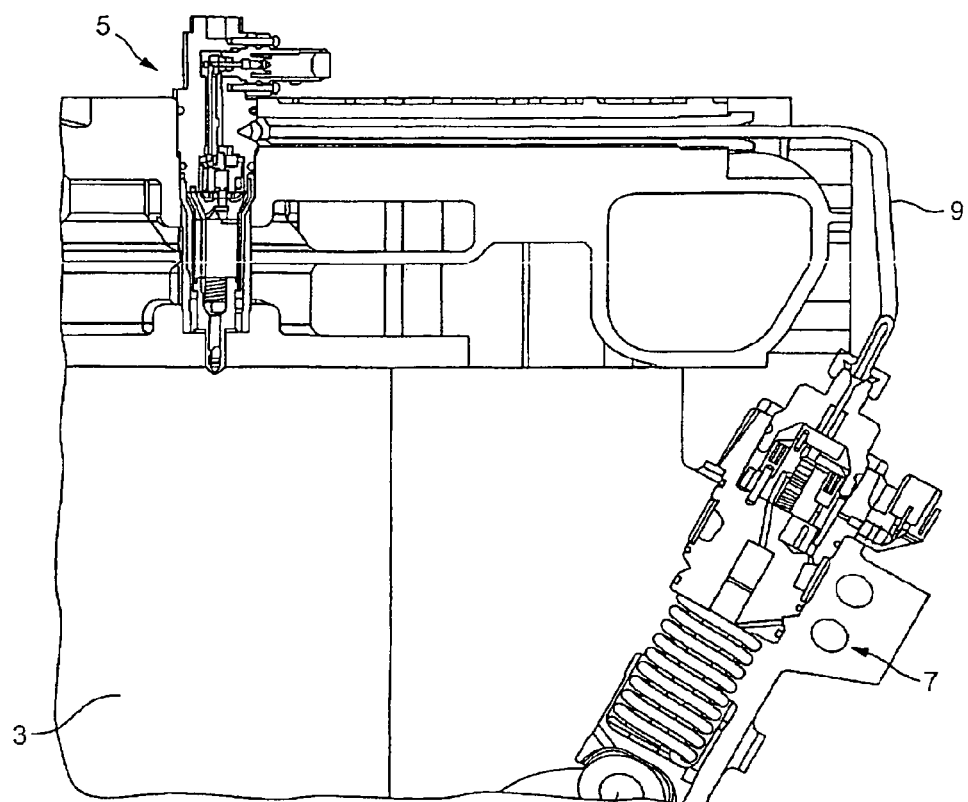
FIGS. 1a and 1b are schematic installation representations of a known fuel injector in which the injector is divided into two parts.
Figure 1B:
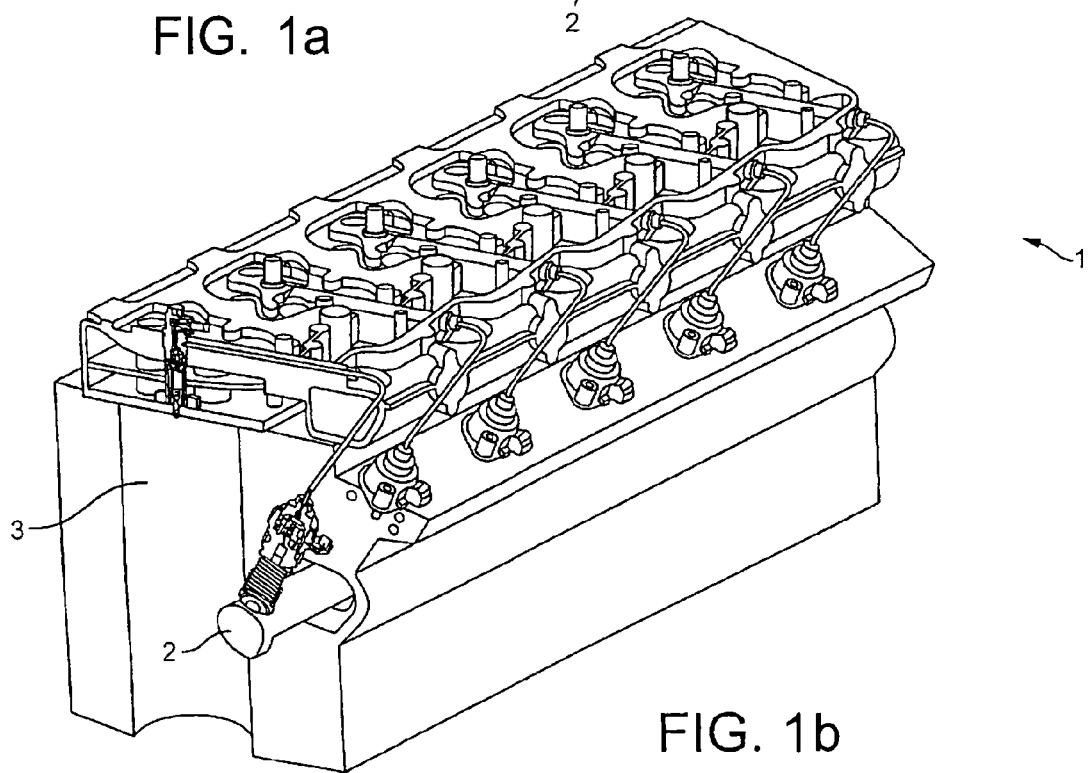
Figure 2:
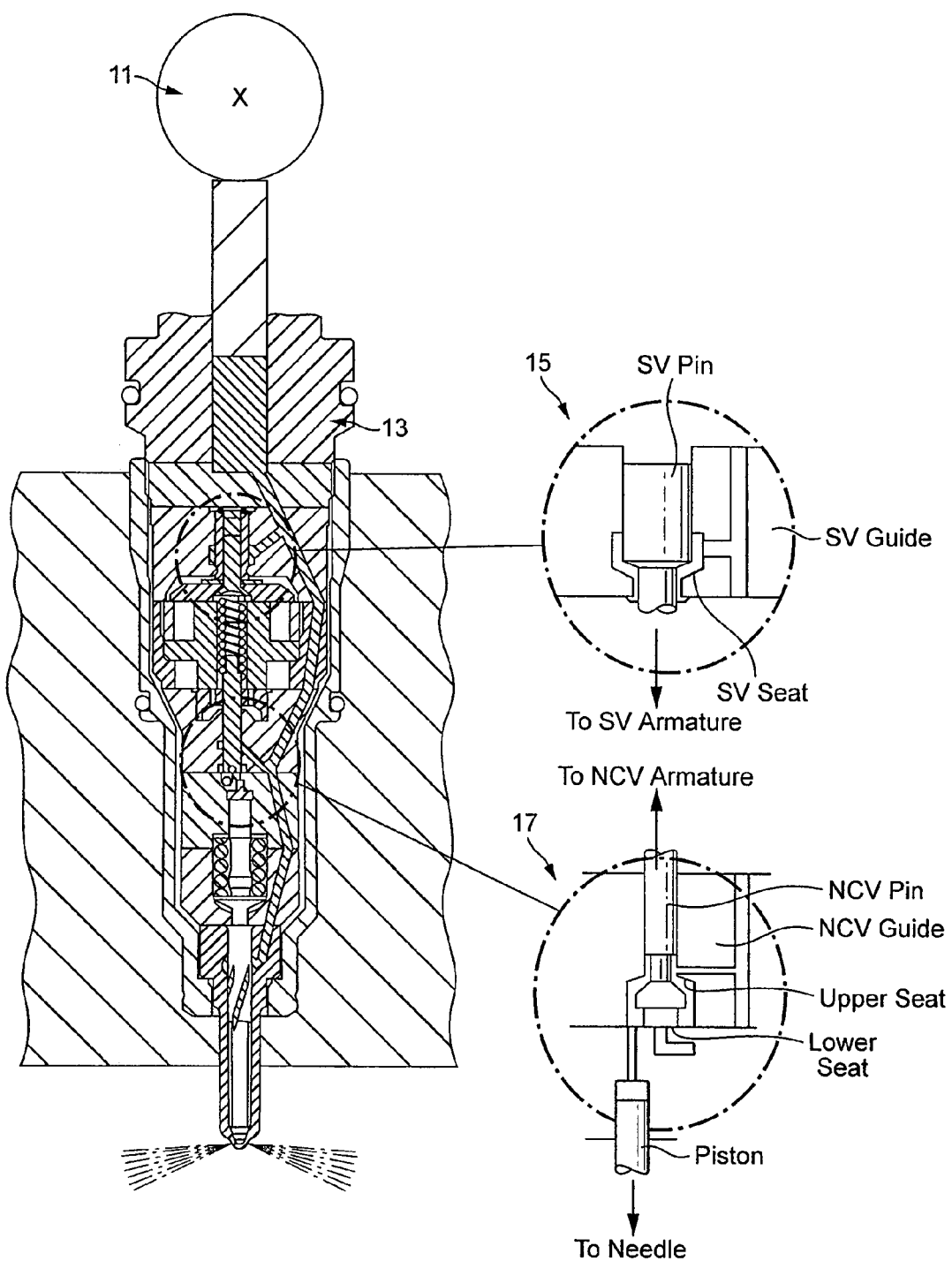
FIG. 2 is a sectional view of a known multi-valve one piece or unit injector.
Figure 3:
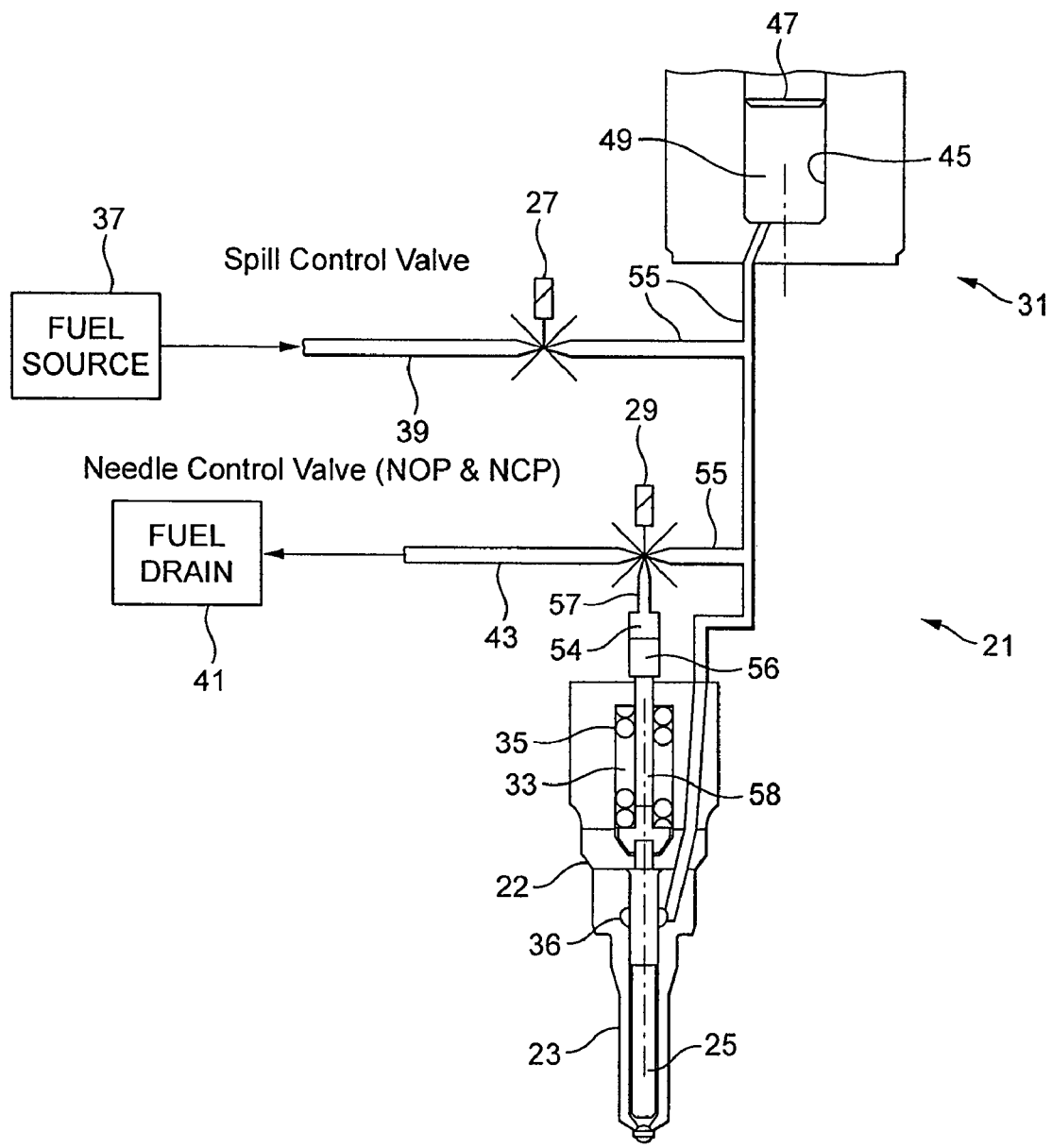
FIG. 3 is a schematic representation of the control valves within an injector.

FIG. 3 is a diagrammatic representation of the various components of a two valve unit injector. It is noted that the injector may be configured into the engine configuration shown in FIGS. 1a and 1b or the configuration shown in FIG. 2.

In FIG. 3 an injector 21 comprises an injection body 22, which houses a needle 25 with a nozzle region 23 of the injector, a pressure control valve 27, a needle control valve 29 and a pump arrangement 31. The various components are in fluid communication with each other by virtue of a number of fuel supply passages as described in further detail below.

The injector further comprises a spring chamber 33 within the body of the spring chamber body nozzle 23. A spring 35 within the spring chamber 33 acts to urge the needle 25 in a downwards direction towards a needle seating (the chamber 33 is in fluid communication (not shown) with a fuel drain). A delivery chamber 36 is defined by the needle 25 and its associated bore and engagement of the needle 25 with the seating prevents fuel within the delivery chamber 36 flowing past the seating and out through outlet openings (not shown) in the injection nozzle into the associated engine cylinder or other combustion space.

Movement of the needle 25 away from its seating is controlled by fuel pressure variations within the injector body 22 that act on thrust surfaces (not shown) on the needle 25.

The pressure control valve 27 is in fluid communication with a source of fuel 37 via a fuel supply passage 39.

The needle control valve is in communication with a fuel drain 41 via a supply passage 43.

The pump arrangement 31 of the injector 21 is provided with a bore 45 within which a plunger 47 is slidable. The plunger 47 and bore 45 define a pump chamber 49. The plunger 47 is associated with a cam arrangement (not shown in FIG. 3) such that rotation of the cam arrangement causes the plunger 47 to slide within the bore 45.

The fuel source 37 is connected, when the pressure control valve 27 is open, to the pump chamber 49 by means of a supply passage 51. The supply passage branches into two further supply passages 53, 55. Passage 53 connects the fuel source 37 and pump chamber 49 to the delivery chamber 36. Passage 55 connects to the needle control valve 29 which, in turn, is in communication with the fuel drain 41 via supply passage 43.

The needle control valve 29 is also connected to a further fluid supply passage 57. This supply passage 57 opens out into a further chamber 54 which houses a further plunger 56. Further plunger 56 is in turn in communication with a pin 58 which passes through the spring chamber 33 to the top of the needle 25. The needle control valve 29 is operable to move from a first (closed) position in which the further chamber 54 is in communication with the pump chamber 49 and pressure control valve 27 and the supply passage 43 to the fuel drain 49 is blocked and a second (open) position in which the flow of fuel from the pump chamber 49 or fuel source 37 to the further chamber 54 is blocked and the fuel drain 49 is in communication with the further chamber 54 thereby allowing pressurised fuel within the further chamber 54 to dump to the fuel drain.

Movement of the needle 25 is therefore controlled by fuel pressure variations between the further chamber 54 and the pressure on the thrust surfaces of the needle 25.

When the needle control valve 29 is in the closed position the further chamber 54 is pressurised with fuel from the pump chamber 49. The pump chamber 49 also supplies fuel to the delivery chamber 36 (and therefore to the thrust surfaces of the needle 25). Therefore, the pressure within the further chamber 54 counteracts the pressure from the thrust surfaces and the needle remains on its seating.

When the needle control valve 29 is in the open position the further chamber 54 is in communication with the fuel drain 41 thereby allowing fuel within the chamber 54 to dump to the low pressure drain. As the fuel drains the further plunger 56 and pin 58 lifts off of the top of the needle 25 and the pressure acting on the thrust surfaces of the needle 25 becomes sufficient to lift the needle away from its seating.

It is noted that the pressure control valve 27 and needle control valve 29 will typically be pressure balanced valves in order to make valve operation at high pressures easier.

The fuel source 37 may be a common rail supplying fuel at rail pressure (approx 200-1000 bar) or alternatively may be a transfer pump supplying fuel at transfer pressure (approx 6 bar).

The operation of the fuel injector of FIG. 3 will now be described.

1) The pressure control valve 27 is opened such that fuel from the fuel source 37 is supplied to the plunger volume 49. The plunger 47 is moving upwards such that the plunger volume 49 is increasing. The needle control valve 29 is closed such that the plunger volume 49 is connected to the spring volume 33 above the needle 25.

2) Fuel continues to enter the injector until the plunger 47 reaches the top of its motion. As the plunger 47 begins to move in a downwards direction fuel will spill back from the plunger volume 49, through the pressure control valve 27 towards the fuel source 37. It is noted that the pressure control valve 27 is sometimes referred to as a spill control valve in this context.

3) The pressure control valve 27 is then closed and, once closed, fuel pressure within the system rises. The point at which the pressure control valve 27 is closed will determine the injection pressure through the nozzle outlet openings once injection begins. It is noted that, since the needle control valve 29 is in its closed position, the plunger 47 will pressurise both the fuel within the delivery chamber 36 (via the supply passage 53) and the fuel within the further chamber 54 (via the supply passages 55 and 57). Since the pressure within the two chambers (36, 54) is equal the spring 35 will hold the needle 25 against its seating to prevent injection taking place.

4) Injection is initiated by switching the needle control valve 29 from the closed position to the open position. In the open position the further volume 54 is in communication with the fuel drain 41, which is at a low pressure. Fuel therefore flows from the further chamber 54 to the fuel drain and a pressure imbalance develops between the delivery chamber 36 and the further chamber 54. Fuel pressure acting on thrust surfaces of the needle 25 now acts to lift the needle from its seating against the action of the spring 25 and injection through the outlet openings takes place.

5) Injection is stopped by closing one or both of the pressure control valve 27 or needle control valve 29. For example, the pressure control valve may be opened and the needle control valve may be closed to stop injection.

Figure 4:
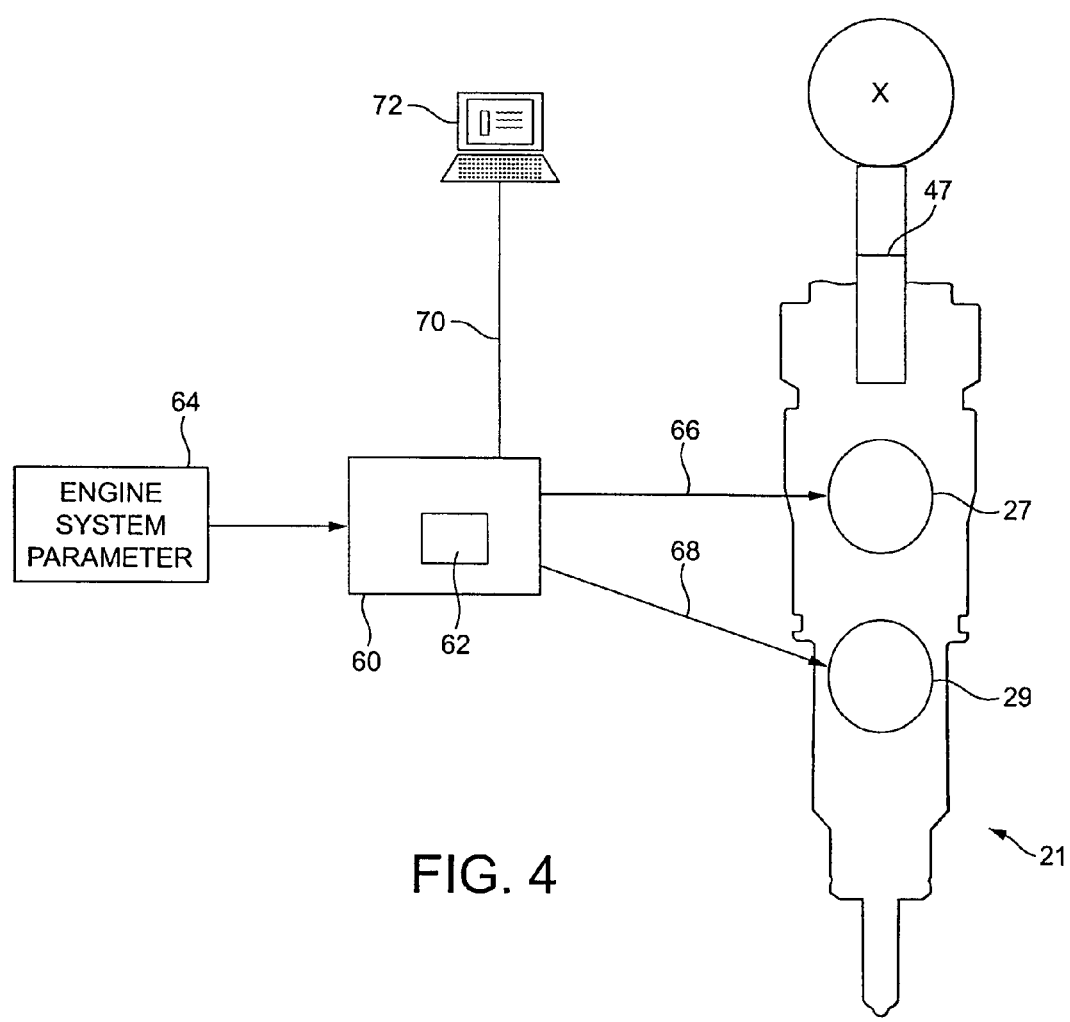
FIG. 4 illustrates a controller in accordance with embodiments of the present invention for determining the presence of faults within a system.

FIG. 4 shows a controller according to embodiments of the present invention. FIG. 4 shows an injector 21 having a pressure control valve 27 and a needle control valve 29. A cam driven plunger 47 pressurises fuel within the injector. Note like numerals have been used to denote like features between FIGS. 3 and 4. A controller 60 for determining the presence of faults within the injector 21 according to an embodiment of the present invention comprises a processor 62. Engine system parameter 64 (for example, engine speed and/or fuel quantity injected by the injectors) is input into the controller 60 and the processor 62 outputs signals 66 and 68 to control the pressure control valve 27 and needle control valve 29 respectively.

The controller 60 follows a diagnostics test procedure, as described in detail below, to determine the presence and location of faults within the injector. During the diagnostics test procedure the processor 62 controls control functions output from the controller to the valves of the injector 21 under test. The processor monitors the change in one or more engine system parameters (such as engine speed or quantity of fuel injected per injection cycle by the injectors not under test) as the valves are controlled in order to determine if the injector is faulty and, if it is determined that there is a fault, where the fault is within the injector.

The controller may also output a notification signal 70 to a notification device 72 such as a computer terminal to allow the results of the diagnostic test procedure to be viewed by a user.

The diagnostic test procedure will now described.

Initially, the engine is stabilised to allow the test to be performed. The amount of fuel delivered to each cylinder within the engine is captured and the fuelling is fixed to this amount.

It is noted that to avoid damage to the fuel injectors during the diagnostic test procedure (during which time the controller will open and close the injectors outside of the normal modes of engine operation) the engine is governed such that it is just turning over (e.g. the vehicle is in neutral and stationary such that there are no or low load conditions on the engine). This reduces the stress on the injectors and injector valves during the diagnostic test procedure and also permits small changes in engine speed to be detected. Furthermore, running the engine at no load or low load conditions enables the relatively small changes associated with this test to be more detectable.

The cylinders (i.e. the injectors) are then tested one after another. The cylinder under test is referred to as the test cylinder.

The controller determines whether the test cylinder has any faults by performing one or more of the following test procedures: closed needle test; minimum drive pulse test, or; high pressure spill test.

Figure 5:
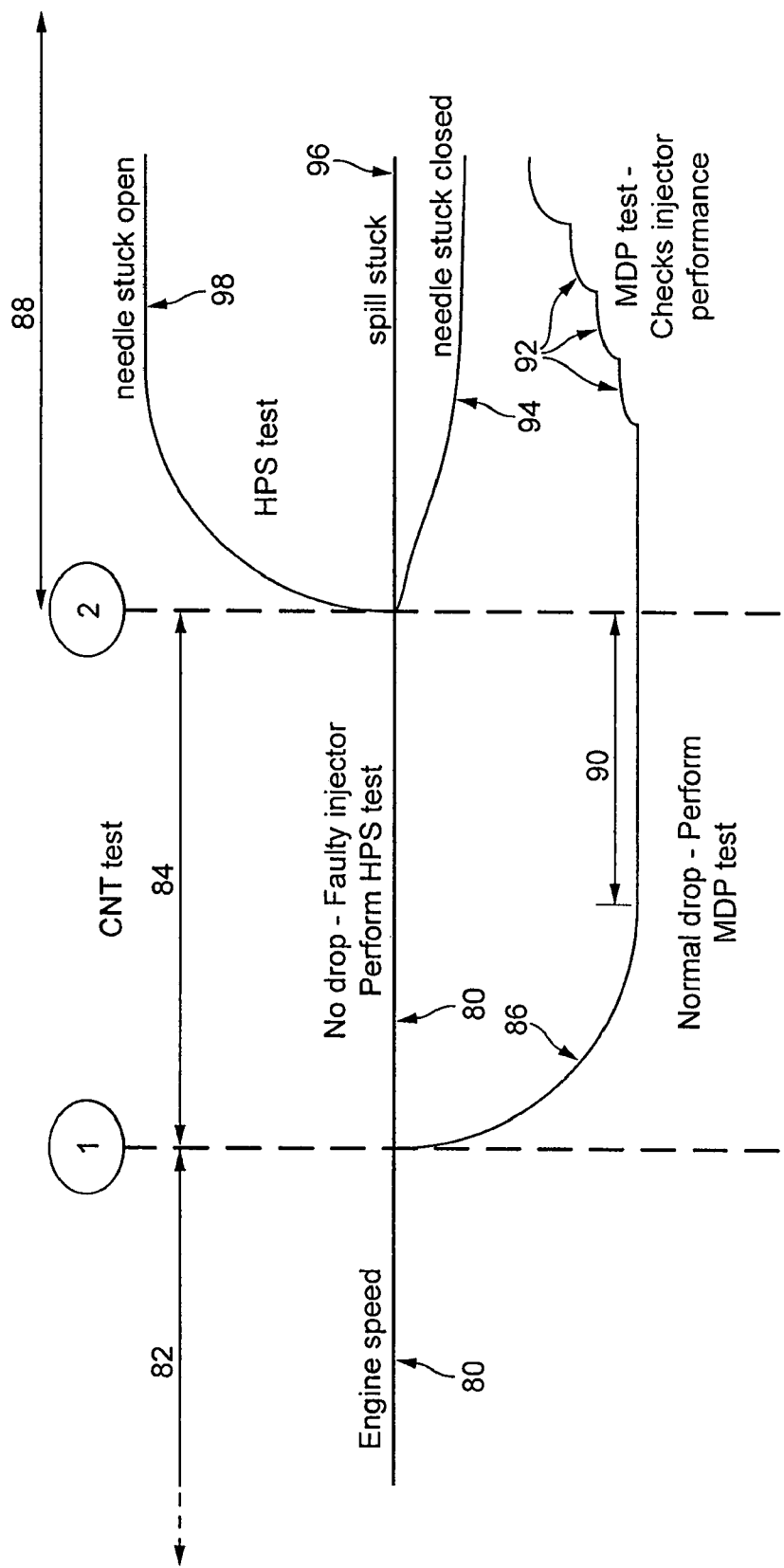
FIG. 5 shows how engine speed varies during a fault finding test as run on an engine by a controller according to a first embodiment of the present invention.
Figure 6:
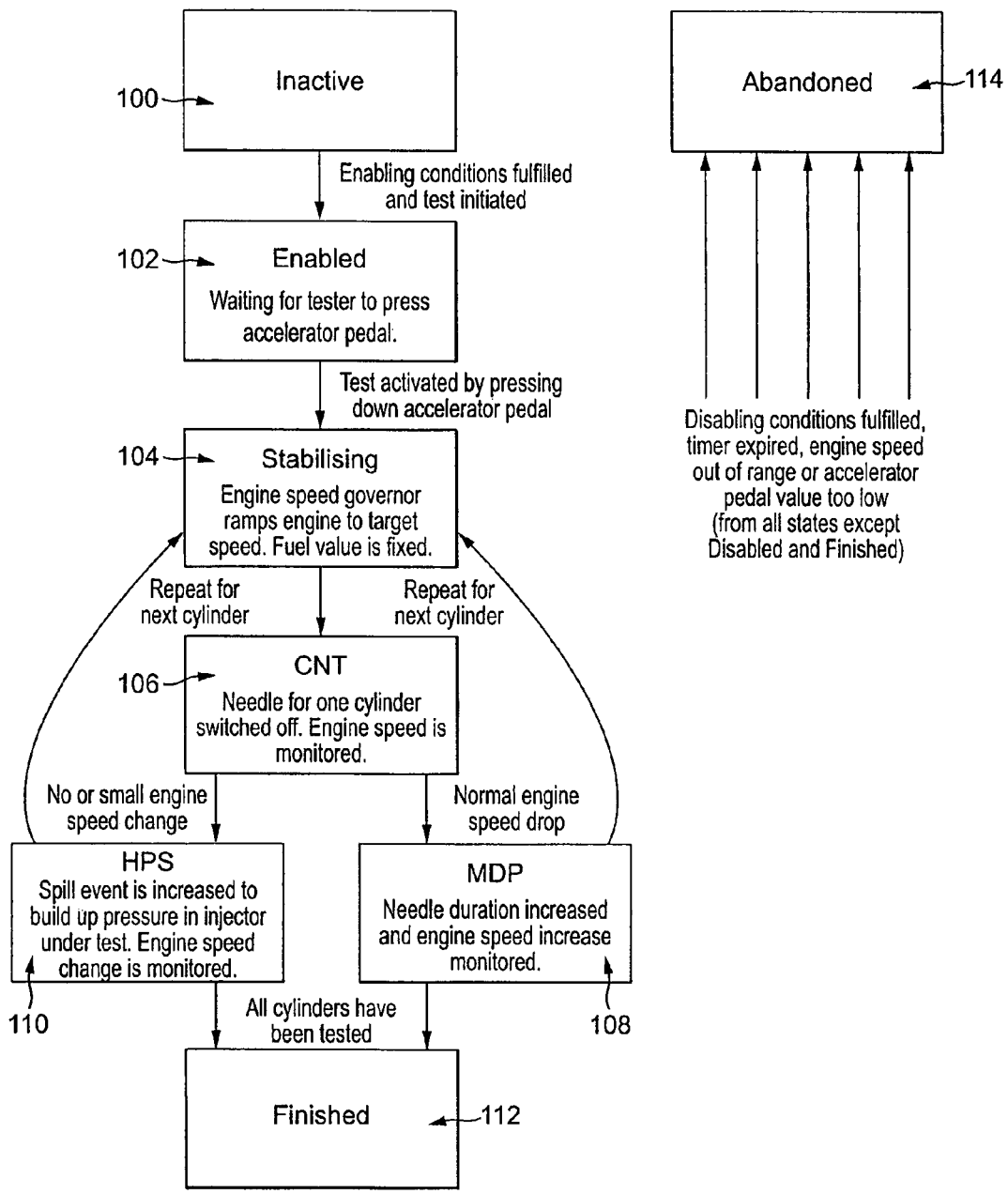
FIG. 6 is a flow chart of the fault finding process according to the first embodiment of the present invention.

FIGS. 5 and 6 describe the diagnostic procedure according to a first embodiment of the invention in which the fuel quantities supplied from the injectors not under test are kept fixed during the procedure and the engine speed is allowed to vary.

Returning to FIG. 5, the engine speed is initially stabilised (in the stabilising section labelled 82 in FIG. 5) to a constant level 80. The controller 60 then performs a "Closed Needle Test" (CNT) on the test cylinder (CNT section 84). The object of this part of the test procedure is to determine if the test cylinder has any major faults. The outcome of the CNT determines which of two further tests the controller applies to the test cylinder.

During the CNT the processor 62 of the controller 60 outputs a control function to keep the needle control valve 29 of the injector under test closed. As noted above, when the needle control valve is closed the pump chamber 49 is in fluid communication with the further chamber 54 of the injector 21. This therefore means that the pressure in the further chamber 54 is equal to the pressure acting on the thrust surfaces of the needle thereby preventing injection from taking place.

It is noted that, when the controller 60 outputs the control function to keep the needle control valve 29 of the test injector closed, all other engine conditions are kept as constant as possible and the fuel delivery to the cylinders (injectors) not under test is kept at the fixed value determined in the stabilising part of the procedure.

If the test cylinder was faulty before the closed needle test was initiated in such a way that no fuel was delivered from it anyway, then outputting a control function closing the needle control valve 29 during the CNT will not change (or at least will not substantially change) any fuelling conditions and the engine speed will substantially remain at the constant value 80 in the CNT section 84.

However, if the test cylinder was operating normally prior to the CNT, then keeping the needle control valve 29 closed will reduce the amount of fuel injected into the engine by the injection system as a whole and the engine speed will consequently drop 86 in the CNT section 84.

The controller conveniently compares the measured engine speed data (as received by the controller's inputs) with predetermined engine performance data in order to identify a "normal" engine speed change on closure of the needle control valve throughout the injection cycle.

The processor 62 can monitor the engine speed 64 input to the controller 60 and can therefore determine which cylinders have injectors with major faults from cylinders with functioning injectors.

Depending on the result of the CNT test the controller 60 then performs either (i) a Minimum Drive Pulse (MDP) test, or (ii) a High Pressure Spill (HPS) test in the MDP/HPS section 88 of the test procedure.

If the controller/processor determines that an injector has no major faults in the CNT section 84 (i.e. if the engine speed dropped as expected when the needle control valve 29 was closed) then the controller performs the MDP test on the injector.

As noted above, for injectors that are operating substantially normally, the CNT section 84 of the test procedure will result in a drop 86 in engine speed from the engine speed level in the stabilising section 80 of the test to a new lower level. Prior to performing the MDP test, the controller allows the engine speed to stabilise at the new lower level (as denoted by section 90 in FIG. 5).

The processor then arranges for the controller to output a control function that gradually re-opens the needle control valve 29 that was closed during the CNT section 84 of the test so that fuelling is brought back to the test injector (i.e. the needle control valve is gradually opened from a zero opening period to its normal opening period over the course of a number of injection cycles). In order to gradually re-open the needle control valve, the control function is arranged to increase the drive pulse input to the needle control valve 29 in increments, each increment lasting for a number of injection cycles. Increasing the drive pulse in increments allows the engine to stabilise after each incremental drive pulse increase.

As fuel is delivered through the test injector the engine speed will change and this can be monitored by the processor 62. In this manner the minimum drive pulse of the needle control valve that is required to enable injection to take place can be determined.

The processor may also monitor how quickly and by how much the engine speed increases when the test cylinder starts fuelling again. This enables the processor to determine how well injection is working through the test cylinder. Depending on variations in the change in engine speed and the time taken for the engine speed to change a multitude of minor injection issues can be identified by the processor in the MDP test. For example, partly blocked injector nozzles will affect the speed at which the engine responds to fuel changes within the injector and this can be identified by the controller/processor.

In order to identify the various minor injection faults that may occur in the engine, the processor preferably has access to a data store comprising predetermined injector data representing different injector fault conditions. The processor may then compare the measured engine speed changes with the predetermined data in order to determine any minor faults within the test injector.

It is noted that the engine speed change resulting from the gradual re-opening of the needle control valve 29 is depicted in FIG. 5 by the series of steps 92 in the measured engine speed of the engine.

If the controller/processor determines during the CNT section 84 of the test procedure that an injector has a major fault then the controller performs the HPS test on the injector. The IPS test identifies whether the fault is in the needle control valve 29 or the pressure control valve 27 of the test injector.

The principle behind the HPS test is that creating a high pressure within the injector using the pressure/spill control valve 27 without injecting any fuel through the injection nozzles will put a load on the engine and affect the measured engine speed. A fully functioning injector will be able to create such a high pressure by closing the needle control valve 29 (i.e. blocking the spring chamber 33 within the injector from the fuel drain 44) and by also closing the pressure control valve 27.

Using the above principle the controller/processor can identify the following fault conditions during the HPS test:

1) Needle control valve stuck closed. The controller will already have output a control function to the needle control valve to keep closed during the closed needle test described above. At point 2 in FIG. 5, the processor additionally arranges for the controller to output a control function to the pressure control valve of the test injector to close. The HPS test is only performed on injectors that have been identified as having a major fault, i.e. either the pressure or needle control valves is faulty. If the pressure rises during the HPS test then this means that the pressure control valve is functioning correctly and therefore by inference the needle control valve is jammed shut (the logic in this case being that: (i) the CNT procedure has identified a fault in either the pressure or needle control valves; (ii) the change in pressure during the HPS test confirms that it is the needle control valve that is stuck, and; (iii) the fact that the pressure has risen confirms that the needle control valve is stuck closed as opposed to stuck open).

The pressure within the test injector will be in the range of around 200-400 bar during the closed needle test. If both valves are closed the pressure within the injector will rise to around 1500 bar.

It is noted that for a two part injector the high pressure will be created in the high pressure line between the two parts of the injector. In the case of a multi-valve single injector the high pressure will be created in the supply passage between the pressure control and needle control valves.

The creation of the high pressure condition within the injector will result in extra work for the engine and as a result the engine speed of the engine will fall as illustrated by trace 94 in FIG. 5. The change in engine speed can be monitored.

2) Pressure control valve stuck. To determine if the pressure control valve is stuck the processor arranges for the controller to output a control function to both valves to close. If the pressure control valve is stuck then the injector will be unable to create the high fuel pressure that the controller has demanded. In this case the load on the engine will not increase and the engine speed will remain the same (as indicated by trace 96 in FIG. 5). The controller and processor will be able to monitor the engine speed and after a certain test time without any significant engine speed change it can be concluded that the pressure control valve (and the injector pump part) of the injector is faulty.

3) Needle control valve is stuck open. If the needle control valve is stuck open (i.e. the further chamber 54 of the injector is permanently connected to the fuel drain 44) then the injector will inject any fuel that the pump part of the injector delivers. If the controller has output a control function to generate a high pressure situation within the injector then the injector will inject all of the fuel within the injector in the event that the needle control valve is stuck open. This injection of fuel will result in an increase in engine speed which again can be detected by the controller such that the processor can determine that the needle control valve is stuck open. The increase in engine speed is represented in FIG. 5 by the trace 98.

The controller will test each cylinder (and therefore each injector) in turn and perform a CNT followed by a MDP test or a CNT followed by an HPS test on each one.

It is noted that the expected engine speed decreases 86 and 94 and the engine speed increase 98 shown in FIG. 5 can be calibrated for the engine during manufacture. The values of such increases/decreases can be stored within the data store mentioned above such that the processor can determine the fault conditions of the injector valves.

FIG. 6 shows the whole diagnostic test procedure as represented by a state diagram and undertaken by the controller in the first embodiment of the present invention.

Initially in step 100 the controller is inactive. The Inactive state is the state of the controller during all vehicle conditions outside of the diagnostic procedure, e.g. normal vehicle/engine operation/driving). Once the test is initiated by a user the controller moves to step 102 (the Enabled state) and waits for the test to be activated.

In order to go from Inactive to Enabled there are a number of conditions that need to be fulfilled to ensure safe operation of the diagnostic test. For example, the handbrake needs to be on, no other important faults should have been detected by the engine management system etc.). It is envisaged that the diagnostic test will be performed at a vehicle repair and maintenance centre and that a diagnostic tool/computer will have been connected to the vehicle's engine control unit to instruct it to enter the Enabled state. Once in this enabled state the procedure can be activated.

Conveniently the test may be activated by pressing down on the accelerator pedal of the vehicle. Upon activation the controller moves to Step 104 in which the engine conditions are stabilised prior to testing the cylinders for faults.

In Step 104 the engine ramps to and then stabilises at a pre-defined target speed using the standard engine control unit governor. Once the processor detects that stable engine speed conditions have been attained, the amount of fuel delivered to each cylinder is captured and the fuelling is fixed to this amount. When the fuel amount is frozen in this way then engine speed can drift slightly but will then stabilise at a speed close to the previously used governor target speed.

Once the engine conditions have been stabilised the controller begins testing the injectors within the engine for faults and moves to Step 106 in which the closed needle test described above is performed.

In Step 106 the needle control valve for a first injector within the engine is closed throughout the whole injection cycle and the engine speed is monitored by the processor within the controller. The remaining injectors are kept at the fixed fuel values determined in the stabilising Step 104.

If a normal (expected) engine speed drop is detected the controller moves to Step 108 in which a Minimum Drive Pulse test is performed. In Step 108, the needle control valve that was previously closed in Step 106 is gradually re-opened in increments, the duration of each increment lasting for a number of injection cycles (typically in the order of 100 to 1000 cycles), and the engine speed increase is monitored. The processor then determines the operational nature of the first injector from the measured engine speed changes.

Once Step 108 is complete for the first injector the controller moves back to Step 104 and then repeats the closed needle test for the next injector within the engine. The procedure goes back to the stabilising Step 104 after finishing the Minimum Drive Pulse test performed in Step 108. This is because when changing to the next injector after finishing Step 108 the engine needs to be stabilised at a constant engine speed again before entering the closed needle test performed in Step 106. The fixed fuelling during the closed needle test is not necessarily the same when testing injector 1 as when testing, for example, injector 2. If, for example, injector 2 has got a major fault, it is during the Stabilising Step 104 that the other cylinders compensate with more fuel to achieve the desired stable engine speed. This fuelling compensation leads to no engine speed change during CNT.

If, however, the processor does not detect an engine speed change for the first injector then it moves to Step 110 in which a High Pressure Spill test is performed. (It is noted that the controller will also move to the HPS test in the event that a smaller than expected engine speed change is detected in the CNT test).

In Step 110 the controller attempts to build up pressure within the first injector. Changes to the engine speed are again monitored by the processor to determine which valve (pressure control valve or needle control valve) is faulty within the first injector.

Once the faulty valve has been determined by the controller in Step 110, it moves back to Step 104 and then initiates the closed needle test for the next injector within the engine to be tested.

The Steps 104, 106 and 108/110 are repeated until all engines have been tested and the controller then moves to Step 112 and the test is complete.

It is noted that the controller may move to Step 114 (Test abandoned) from any of Steps 102 through 110 at any time. Step 114 may be initiated by fulfilling some predetermined disabling conditions such as the expiry of a timer, the engine speed moving outside of a certain range or the accelerator pedal value being too low.

Figure 7:
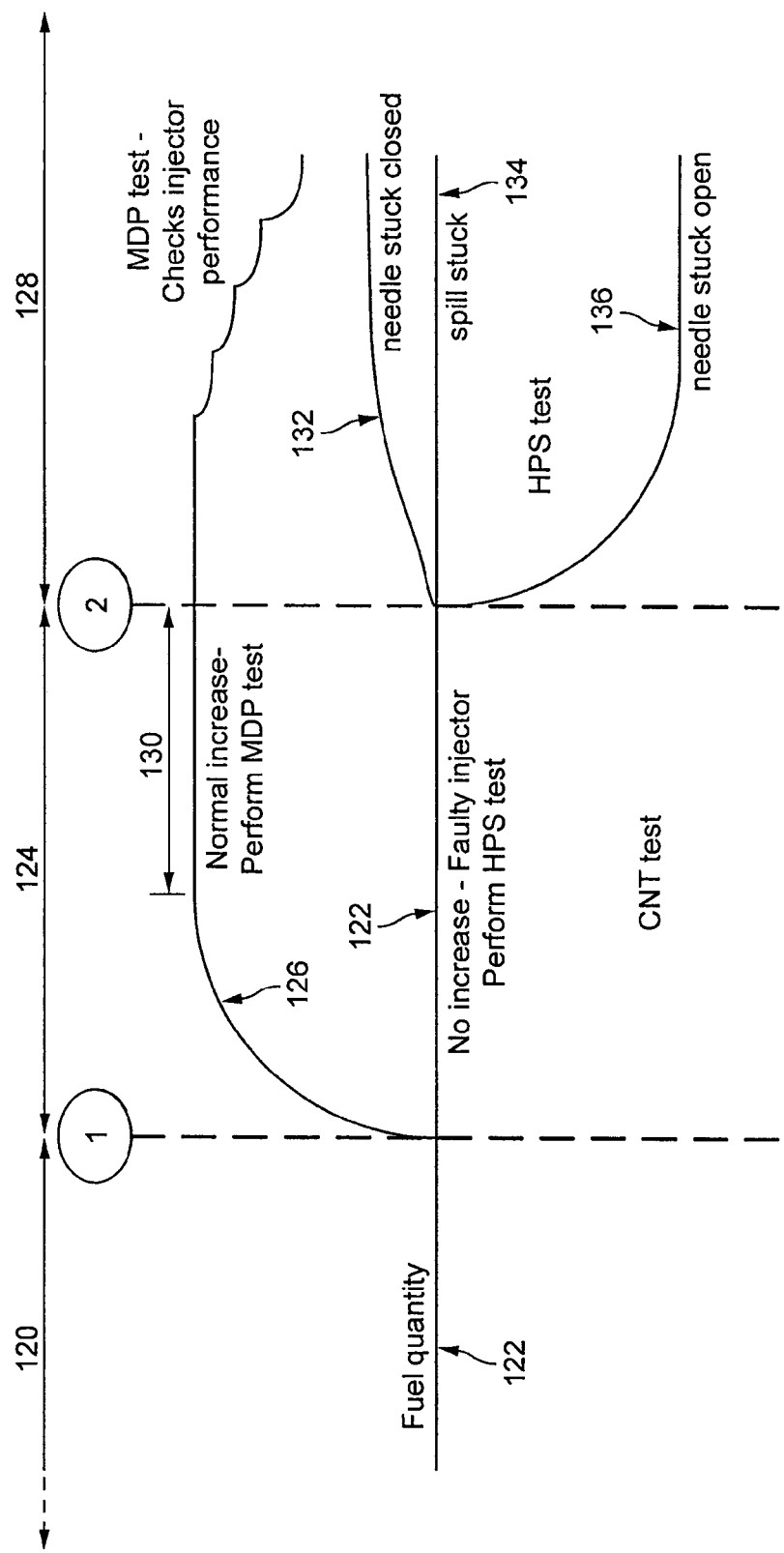
FIG. 7 shows how the quantity of fuel injected per injection cycle varies during a fault finding test as run on an engine by a controller according to a second embodiment of the present invention.
Figure 8:
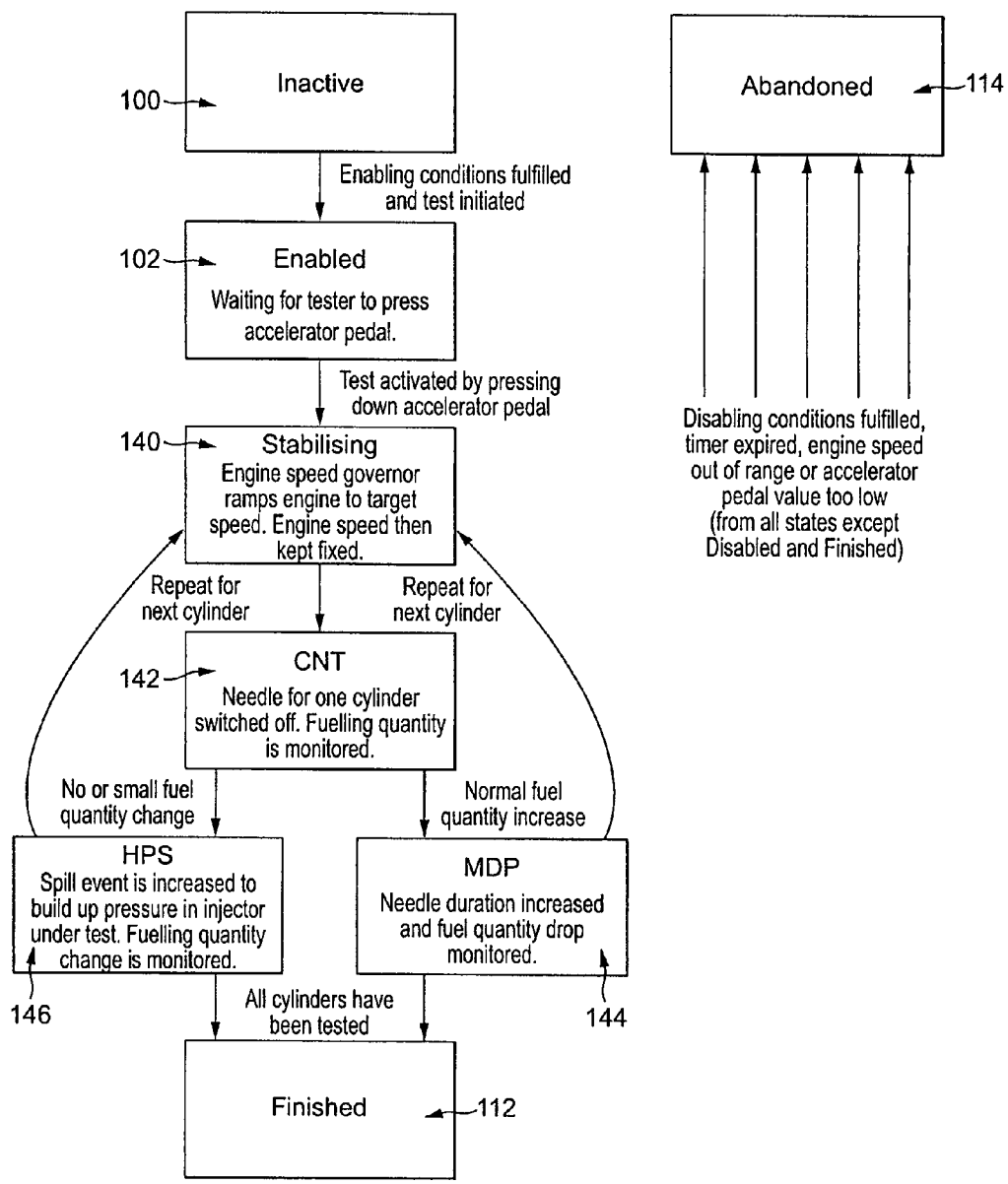
FIG. 8 is a flow chart of the fault finding process according to the second embodiment of the present invention.

FIGS. 7 and 8 describe the diagnostic procedure according to a second embodiment of the present invention in which the engine speed is held at a fixed value during the test and the quantity of fuel injected by the injectors not under test is allowed to vary.

FIG. 7 is equivalent to FIG. 5 except that in this case it shows how the fuel quantity injected per injection cycle by the injectors not under test varies as the processor 62 of the controller 60 performs the closed needle, minimum drive pulse and high pressure spill tests.

Returning to FIG. 7, the engine is initially ramped to a target speed, the engine system is allowed to stabilise (in the stabilising section 120) and the quantity of fuel 122 injected by the injectors not under test is recorded. The engine speed is then fixed and the controller 60 performs a "Closed Needle Test" (CNT) on the test cylinder (CNT section 124). The operation of the CNT part of the procedure is the same as described above with relation to FIG. 5.

It is noted that, in this second embodiment of the invention, when the controller 60 outputs the control function to close the needle control valve 29 of the test injector, the engine speed of the engine system is kept as constant as possible and the fuel delivery to the cylinders (injectors) not under test is allowed to vary.

If the test cylinder was faulty before the closed needle test was initiated in such a way that no fuel was delivered from it anyway, then keeping the needle control valve 29 closed during the CNT will not change (or at least will not substantially change) the engine speed of the engine and the fuel quantity through the remaining injectors will remain at the constant value 122 in the CNT section 124.

However, if the test cylinder was operating normally prior to the CNT, then closing the needle control valve 29 will reduce the amount of fuel injected into the engine by the injection system as a whole. The remaining injectors will compensate for the closure of the test cylinder injector in order to keep the engine speed at its fixed level. They will therefore inject a greater quantity of fuel per injection cycle and the fuel quantity data will show a rise 126 in the injected fuel quantity in the CNT section 124.

The controller conveniently compares the measured fuel quantity data (as received by the controller's inputs) with predetermined engine performance data in order to identify a "normal" fuel quantity change on closure of the needle control valve on the test injector.

Depending on the result of the CNT test the controller can then perform either (i) the MDP test or (ii) the HPS test in section 128 of the test procedure in a similar manner to that described in relation to FIG. 5.

If the controller/processor determines that an injector has no major faults in the CNT section 124 (i.e. if the quantity of fuel injected by the injectors not under test increased as expected when the needle control valve 29 was kept closed) then the controller performs an MDP test on the test injector. Prior to performing the MDP test however the controller allows the fuel quantities to stabilise at their new higher level (as denoted by section 130 in FIG. 7).

The needle control valve 29 of the test injector is then gradually re-opened in increments over a number of injection cycles and the minimum drive pulse of the needle control valve that is required to enable injection to take place is determined.

The processor may monitor how the fuel quantity injected per injection cycle by the injectors not under test varies (and how quickly the variations occur) in order to identify minor injection issues associated with the test cylinder. The measured changes in the fuel quantity can again be compared to pre-existing data stored in a data store.

If the controller/processor determines that the test injector has a major fault during the CNT test, then an HPS test is performed. The general operation of the test is as described above. However, in this embodiment the creation of a high pressure condition within the test injector will result in an increase in the quantity of fuel injected via the other injectors as they attempt to compensate for the extra load placed on the engine.

Therefore, for the fixed engine speed and varying fuel quantity embodiment the processor uses the following logic to identify the fault conditions during the HPAS test:

1) If the needle control valve is shut closed then the extra work that this causes the engine during the HPS test will cause a rise in the quantity of fuel injected through the other injectors, as illustrated by trace 132 in FIG. 7.

2) If the pressure valve is stuck then there will be no change in the quantity of fuel injected through the other injectors, as illustrated by trace 134.

3) If the needle control valve is stuck then there will be a decrease in the quantity of fuel injected through the other injectors as all fuel supplied to the test injector will be injected. This decrease is indicated by trace 136 in FIG. 7.

As for the first embodiment of the present invention, the expected fuel quantity increases 126, 130 and decrease 136 shown in FIG. 7 can be calibrated for the engine system during manufacture. The values of such increases/decreases can be stored within the data store mentioned above such that the processor can determine the fault conditions of the injector valves.

FIG. 8 shows the diagnostic test procedure undertaken by the controller in the second embodiment of the present invention as a state diagram.

Like process steps between FIGS. 6 and 8 are represented as like numerals. Initially the controller is inactive (Step 100) and is then enabled by an operator (Step 102). Upon activation the controller moves to Step 140 in which the engine conditions are stabilised prior to testing the cylinders for faults.

The stabilisation Step 140 is very similar to the stabilisation Step 104 in FIG. 6. However, in this case once the processor detects that stable engine conditions have been attained the engine speed is fixed.

Once the engine conditions have been stabilised the controller begins testing the injectors for faults and moves to Step 142 in which the needle control valve for a first injector is switched off and the amount of fuel delivered to the combustion space by the remaining injectors is monitored by the processor within the controller.

If a normal fuel quantity increase is detected the controller moves to Step 144 in which a Minimum Drive Pulse test is performed by gradually re-opening the needle control valve in the test injector and monitoring the fuel quantity changes.

Once the MDP test has been performed on the first injector the controller moves back to Step 140 and the process repeats for another cylinder (injector) within the engine.

If, however, the processor does not detect the expected fuel quantity increase in Step 142 then it moves to Step 146 in which a High Pressure Spill test is performed. Changes to the fuel quantities injected by the other injectors are monitored to determine which valve (pressure control valve or needle control valve) is faulty within the first injector.

Once the faulty valve has been determined the controller moves back to Step 104 and the process repeats for the next cylinder (injector) within the engine.

The Steps 140, 142 and 144/146 are repeated until all engines have been tested and the controller then moves to Step 112 and the test is complete.

It is noted that the controller may move to Step 114 (Test abandoned) from any of Steps 102 through 146 at any time. Step 114 may be initiated by fulfilling some predetermined disabling conditions such as the expiry of a timer, the fuelling parameters moving outside of a certain range or the accelerator pedal value being too low.

The controller and method of the present invention allow the location of injector problems within the fuel injection system of a vehicle to be determined significantly easier than with common diagnostic techniques.

It is noted that without the controller/method of the present invention a diagnostic scenario may follow the following lines:

1) The vehicle driver notices a loss of engine power but no faults are flagged automatically within the engine management system. Alternatively, the engine management system may indicate a misfire in cylinder x but since there may be many causes of a misfire the reason for the engine power loss will be undetermined.

2) The vehicle is taken to a repair garage where a cylinder compression test is first run. This test however shows no problems and so an acceleration test is run.

3) An acceleration test is run which either identifies or confirms a problem with cylinder x without giving any details of the problem.

4) It is concluded that there is a fuel injection problem.

5) The pump part of the injector (i.e. the part associated with the pressure control valve) is replaced.

6) A further acceleration or misfire/test diagnostic is run which indicates that the problem is still present.

7) The needle control valve part of the injector is replaced.

8) A still further acceleration or misfire/test diagnostic is run which indicates that the problem has been solved.

In circumstances where the needle control valve and pressure control valve are located in two separate areas of the engine (see FIGS. 1a/b) then the above repair procedure could be costly and time consuming.

With the controller/method of the present invention the diagnostic procedure would be as follows:

1) The vehicle driver notices a loss of engine power but no faults are flagged automatically within the engine management system. Alternatively, the engine management system may indicate a misfire in cylinder x but since there may be many causes of a misfire the reason for the engine power loss will be undetermined.

2) The vehicle is taken to a repair garage where a cylinder compression test is first run. This test however shows no problems.

3) The various tests run by the controller according to the present invention are run and the faulty injection part and to some extent the type of failure is identified before any repair work has been carried out.

4) The appropriate repair procedure is carried out and a follow up acceleration, misfire or other diagnostic test (for example, the test procedure according to the present invention) is run showing good engine performance and therefore a successful repair.

The controller according to the present invention may be a stand-alone unit within a vehicle. Alternatively, it may be incorporated within an existing engine control unit within the engine. The controller may assume the responsibilities of the engine's governor during a testing phase or alternatively it may output data to the engine's governor to allow the testing to be performed.

In the above description it is noted that the controller performs a closed needle test followed by a minimum drive pulse or high pressure spill test on each injector in turn. However, it is noted that the controller could perform the closed needle test only on each cylinder in turn before performing either of the MDP or HPS tests. However, this is likely to be less accurate than testing each cylinder completely in turn.

It will be understood that the embodiments described above are given by way of example only and are not intended to limit the invention, the scope of which is defined in the appended claims. It will also be understood that the embodiments described may be used individually or in combination.

The invention claimed is:

1. A controller for determining the presence of faults within a fuel injection system of an engine system, the engine system comprising a first injector and at least one further injector, each injector comprising a needle control valve and a pressure control valve, and the controller comprising:

inputs for receiving data relating to a first engine system parameter;

outputs for outputting a control function for controlling the injector valves of each of the injectors, and;

a processor for controlling the control function output from the controller wherein the processor is arranged to output a control function such that the needle control valve of the first injector is kept closed in order to prevent injection from the first injector and to monitor the first engine system parameter as the needle control valve is kept closed, a change in the first engine system parameter indicating that the first injector is operating substantially within normal operating parameters and no, or substantially no, change in the first engine system parameter indicating that the first injector is faulty;

wherein the processor is arranged to output a control function to close the pressure control valve in such a manner that, under normal injector operating conditions, the pressure within the first injector would increase, and to monitor said first engine system parameter in order to determine the presence of a fault in the valves of the first injector;

wherein the processor is arranged to monitor the first engine system parameter and to determine (i) that the second needle control valve is biased closed it the engine speed decreases; or (ii) that the needle control valve is biased open if the engine speed increases.

2. A controller as claimed in claim 1, wherein the controller is arranged to fix a second engine system parameter and to monitor changes in the first engine system parameter in order to determines the presence of faults within the engine system.

3. A controller as claimed in claim 1, wherein the processor is arranged to output a control function to close the pressure control valve in such a manner that, under normal injector operating conditions, the pressure within the first injector would increase, and to monitor the engine speed of the engine in order to determine the presence of a fault in the valves of the first injector.

4. A controller as claimed in claim 1, wherein the processor is arranged to output a control function to close the pressure control valve in such a manner that, under normal injector operating conditions, the pressure within the first injector would increase, and to monitor the quantity of fuel injected by the at least one further injector in order to determine the presence of a fault in the valves of the first injector.

5. A controller as claimed in claim 1, wherein the processor is arranged to determine the presence of faults for each of the injectors within the engine system in turn.

6. A controller as claimed in claim 1, wherein the controller is arranged to stabilise the engine system at a substantially constant speed before determining the presence of faults within the engine system.

7. A controller as claimed in claim 1, wherein the outputs further output a notification signal for display on a notification device.

8. A vehicle comprising a controller as claimed in claim 1.

9. A diagnostic unit for use with a vehicle comprising a controller as claimed in claim 1.

10. A controller for determining the presence of faults within a fuel injection system of an engine system, the engine system comprising a first injector and at least one further injector, each injector comprising a needle control valve and a pressure control valve, and the controller comprising:

inputs for receiving data relating to a first engine system parameter;

outputs for outputting a control function for controlling the injector valves of each of the injectors, and;

a processor for controlling the control function output from the controller wherein the processor is arranged to output a control function such that the needle control valve of the first injector is kept closed in order to prevent injection from the first injector anti to monitor the first engine system parameter as the needle control valve is kept closed, a change in the first engine system parameter indicating that the first injector is operating substantially within normal operating parameters and no, or substantially no, change in the first engine system parameter indicating that the first injector is faulty;

wherein the control function is derived from a control valve drive pulse structure and, following the output of the control function to keep the needle control valve closed, the processor is arranged to re-open the needle control valve incrementally and vary the control function such that the period tat the needle control valve is open is gradually and progressively increased, thereby allowing the processor to determine the minimum width of the drive pulse structure that permits injection to take place through the first injector.

11. A controller as claimed in claim 10, wherein the first engine system parameter is the engine weed and the second engine system parameter is the quantity of fuel injected per injection cycle by the at least one further injector and the processor is arranged to determine the presence of faults within the first injector by analysing the engine speed of the engine as the period the needle control valve is open is progressively increased.

12. A controller as claimed in claim 11, wherein the processor is arranged to determine the type of fault within the first injector by analysing the rate of change of the engine speed.

13. A controller as claimed in claim 11, wherein the processor is arranged to determine the type of fault within the first injector by analysing the rime at which the engine speed begins to change.

14. A controller as claimed in claim 11, wherein the processor is arranged to determine the presence of faults within the first injector by comparing the engine speed data received by the inputs of the controller with predetermined engine performance data.

15. A controller as claimed in claim 10, wherein the first engine system parameter is the quantity of fuel injected per injection cycle by the at least one further injector and the second engine system parameter is the engine speed and the processor is arranged to determine the presence of faults within the first injector by analysing changes in the quantity of fuel injected by the at least one further injector as the period that the needle control valve is open is progressively increased.

16. A controller as claimed in claim 15, wherein the processor is arranged to determine the presence of faults within the first injector by comparing the data received by the inputs of the controller relating to the quantity of fuel injected by die at least one further injector with predetermined engine performance data.

17. A controller as claimed in claim 14, further comprising a data store for storing the predetermined engine performance data.

18. A controller as claimed in claim 16, further comprising a data store for storing the predetermined engine performance data.

19. A controller for determining the presence of faults within a fuel injection system of an engine system, the engine system comprising a first injector and at least one further injector, each injector comprising a needle control valve and a pressure control valve, and the controller comprising:

inputs for receiving data relating to a first engine system parameter;

outputs for outputting a control function for controlling the injector valves of each of the injectors, and;

a processor for controlling the control function output from the controller wherein the processor is arranged to output a control function such that the needle control valve of the first injector is kept closed in order to prevent injection from the first injector and to monitor the first engine system parameter as the needle control valve is kept closed, a change in the first engine system parameter indicating that the first injector is operating substantially within normal operating parameters and no, or substantially no, change in the first engine system parameter indicating that the first injector is faulty;

wherein the processor is arranged to output a control function to close the pressure control valve in such a manner that, under normal injector operating conditions, the pressure within the first injector would increase, and to monitor the engine speed of the engine in order to determine the presence of a fault in the valves of the first injector;

wherein the processor is arranged to monitor the engine speed of the engine and to determine (i) that the needle control valve is stuck closed if the engine speed decreases; (ii) that the needle control valve is stuck open if the engine speed increases, and; (iii) that the pressure control valve has a fault if the engine speed is unchanged.

20. A controller for determining the presence of faults within a fuel injection system of an engine system, the engine system comprising a first injector and at least one further injector, each injector comprising a needle control valve and a pressure control valve, and the controller comprising:

inputs for receiving data relating to a first engine system parameter;

outputs for outputting a control function for controlling the injector valves of each of the injectors, and;

a processor for controlling the control function output from the controller wherein the processor is arranged to output a control function such that the needle control valve of the first injector is kept closed in order to prevent injection from the first injector and to monitor the first engine system parameter as the needle control valve is kept closed a change in the first engine system parameter indicating that the first injector is operating substantially within normal operating parameters and no, or substantially no, change in the first engine system parameter indicating chat the first injector is faulty;

wherein the processor is arranged to output a control function to close the pressure control valve in such a manner that, under normal injector operating conditions, the pressure within the first injector would increase, and to monitor the quantity of fuel injected by the at least one further injector in order to determine the presence of a fault in the valves of the first injector;

wherein the processor is arranged to monitor the quantity of fuel injected by the at least one further injector and to determine (i) that the needle control valve is stuck closed if the quantity of fuel injected by the at least one further injector increases; (ii) that the needle control valve is stuck open if the quantity of fuel injected by the at least one further injector decreases, and; (iii) that the pressure control valve has a fault if the quantity of fuel injected by the at least one further injector is unchanged.

21. A controller for determining the nature of a fault within an injector of a fuel injection system of an engine system, the injector comprising a needle control valve and a pressure control valve, and the controller comprising inputs for receiving data relating to a first engine system parameter;

outputs for outputting a control function for controlling the injector valves of each of the injectors; and processor for controlling the control function output from the controller;

wherein the processor is arranged to output a control function such that the needle control valve of the injector is kept closed in order to prevent injection from the injector and then to gradually re-open the needle control valve and progressively increase the period that the needle control valve is open, thereby allowing the minimum width of the drive pulse structure that permits injection to take place through the injector to be determined;

wherein the processor is arranged to output a control function to close the pressure control valve in such a manner that, under normal injector operating conditions, the pressure within the first injector would increase, and to monitor said first engine system parameter in order to determine the presence of a fault in the valves of the first injector; and wherein the processor is arranged to monitor the first engine system parameter and to determine (i) that the needle control valve is biased closed if the engine speed decreases; or (ii) that the needle control valve is biased open if the engine speed increases.

22. A controller for determining the presence of faults within an injector of a fuel injection system of an engine, the injector comprising a needle control valve and a pressure control valve, the pressure control valve being capable of moving between an open position in which the injector is in fluid communication with a source of fuel and a closed position in which the injector is not in fluid communication with the source of fuel, and the controller comprising:

inputs for receiving data relating to a first engine system parameter;

outputs for outputting a control function for controlling the injector valves of the injector; and a processor for controlling the control function output from the controller;

wherein the processor is arranged to output a control function to keep the needle control valve of the injector closed in order to prevent injection from the injector and to output a control function to close the pressure control valve in such a manner that, under normal injector operating conditions pressure within the injector would increase, and to monitor the first engine speed parameter in order to determine the presence of a fault in the valves of the injector wherein the processor is arranged to monitor the first engine system parameter and to determine (i) that the needle control valve is biased closed if the engine speed decreases; or (ii) that the needle control valve is biased open if the engine speed increases.

23. A method of determining the presence of faults with a fuel injection system of an engine system, the engine system comprising a first injector and at least one further injector, each injector comprising a needle control valve and a pressure control valve, the method comprising:

receiving data relating to a first engine system parameter;

outputting a control function for controlling the injector valves of each of the injectors; controlling the output function from the controller;

wherein the method comprises outputting a control function such that the needle control valve of the first injector is kept closed in order to prevent injection from, the first injector and monitoring the first engine system parameter as the needle valve is kept closed, a change in the first engine system parameter indicating that the first injector is operating substantially within normal operating parameters and no or substantially no change in the first engine system parameter indicating that the first injector is faulty;

further comprising outputting a control function to close the pressure control valve in such a manner that, under normal injector operating conditions, the pressure within the first injector would increase, and to monitor said first engine system parameter in order to determine the presence of a fault in the valves of the first injector; and monitoring the first engine system parameter so as to determine (i) that the needle control valve is biased closed if the engine speed decreases; or (ii) that the needle control valve is biased open if the engine speed increases.

24. A carrier medium for carrying a computer readable code for controlling a processor or computer to carry out the method of claim 23.

25. A controller for determining the presence of faults within a fuel injection system of an engine system, the engine system comprising a first injector and at least one further injector, each injector comprising a needle control valve and a pressure control valve, and the controller comprising:

inputs for receiving data relating to a first engine system parameter;

outputs for outputting a control function for controlling the injector valves of each of the injectors, the control function being derived from a control valve drive pulse structure; and a processor for controlling the control function output from the controller wherein the processor is arranged to output a control function such that the needle control valve of the first injector is kept closed in order to prevent injection from the first injector and to monitor the first engine system parameter as the needle control valve is kept closed, such that:

(i) if the processor detects a change in the first engine system parameter then the processor is arranged to gradually re-open the needle control valve and progressively increase the period that the needle control valve is open, thereby allowing the minimum width of the drive pulse structure that permits injection to take place through the injector to be determined, or;

(ii) if the processor detects no or substantially no change in the fast engine system parameter then the processor is arranged to output a further control function to close the pressure control valve in such a manner that, under normal injector operating conditions pressure within the injector would increase, and to monitor the first engine speed parameter in order to determine the presence of a fault in the valves of the injector;

wherein the processor is arranged to monitor the first engine system parameter and to determine (i) that the needle control valve is biased closed if the engine speed decreases; and (ii) that the needle control valve is biased open if the engine speed increases.

\* \* \* \* \*